Patented Aug. 14, 1945

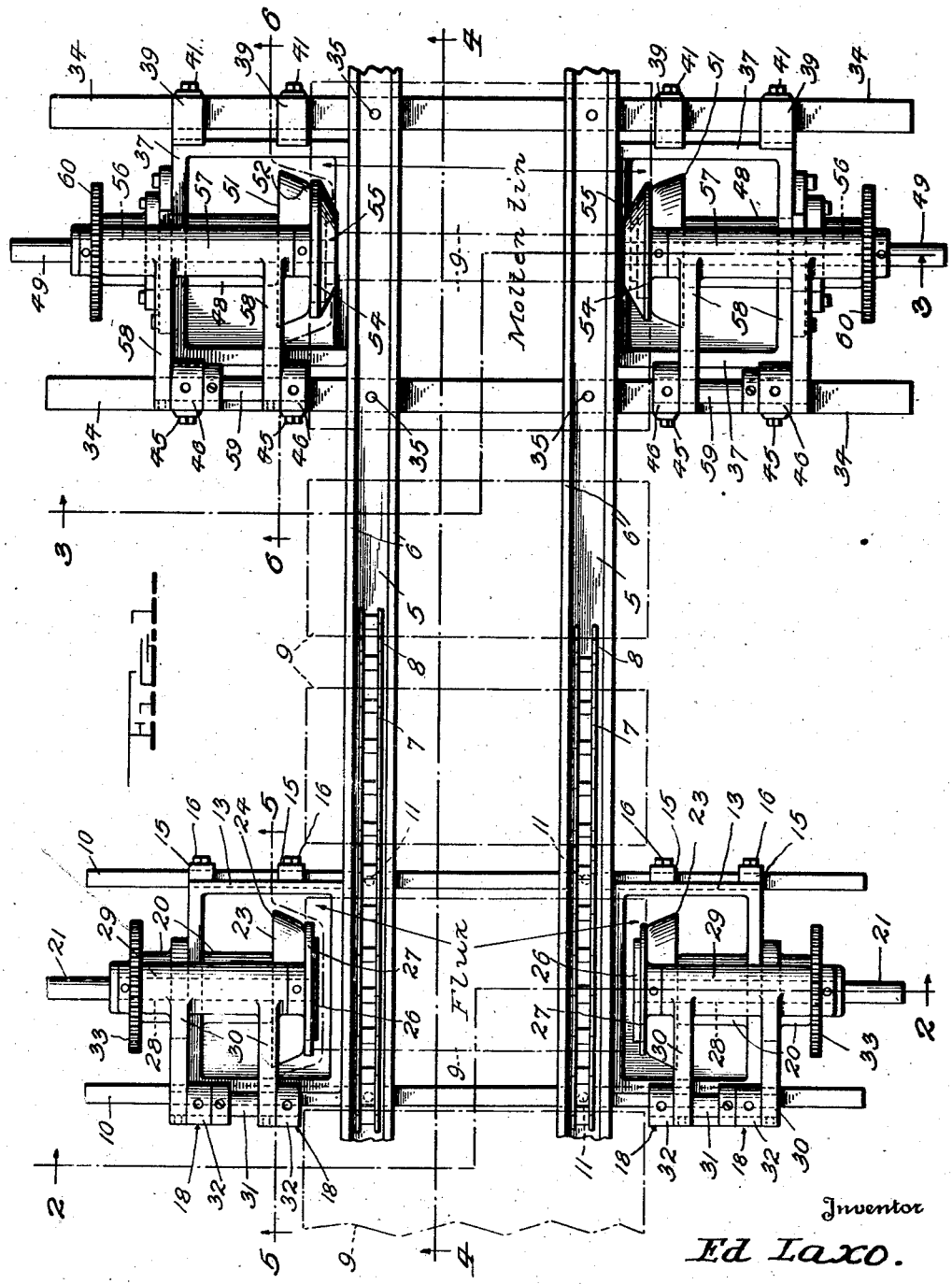

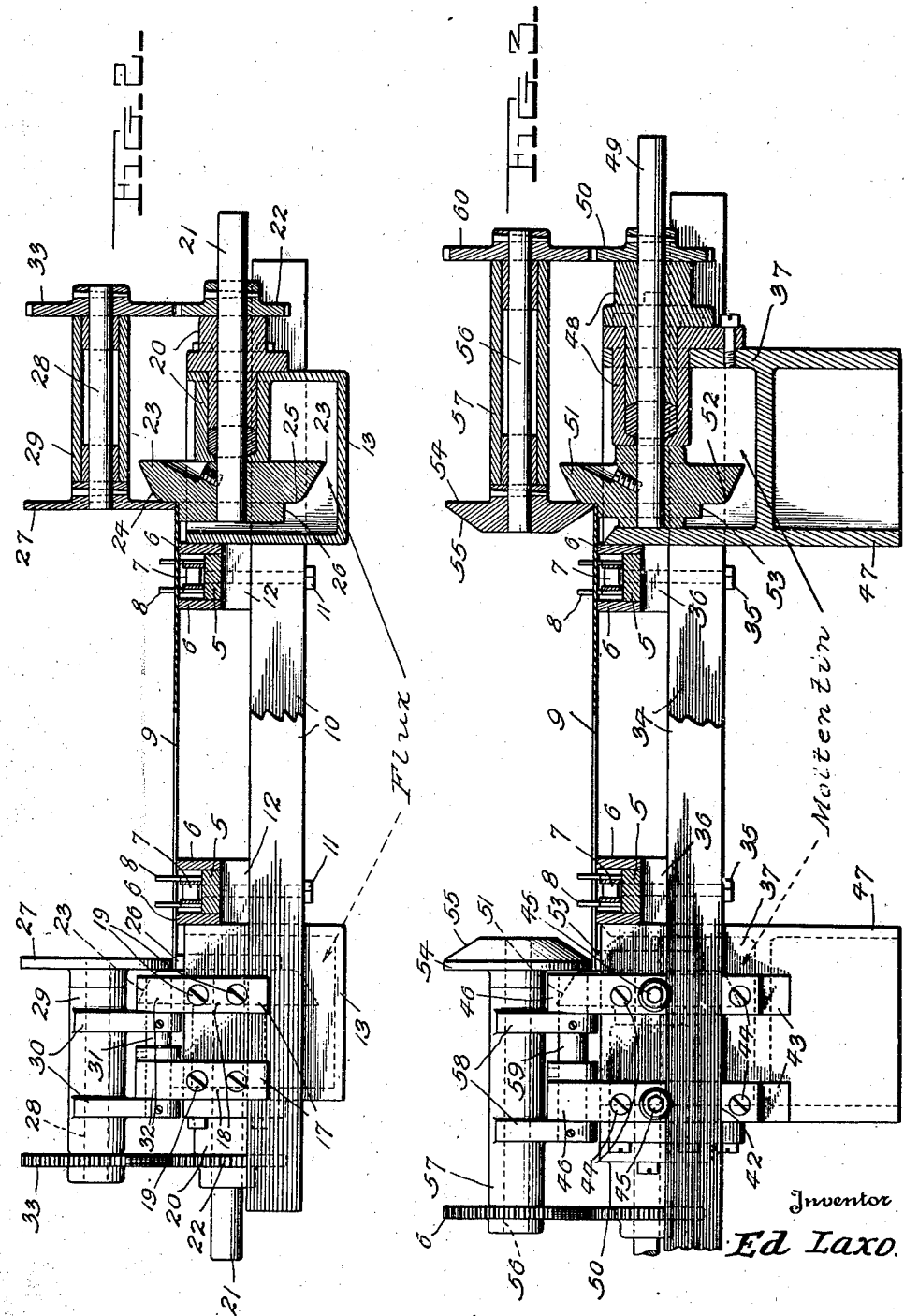

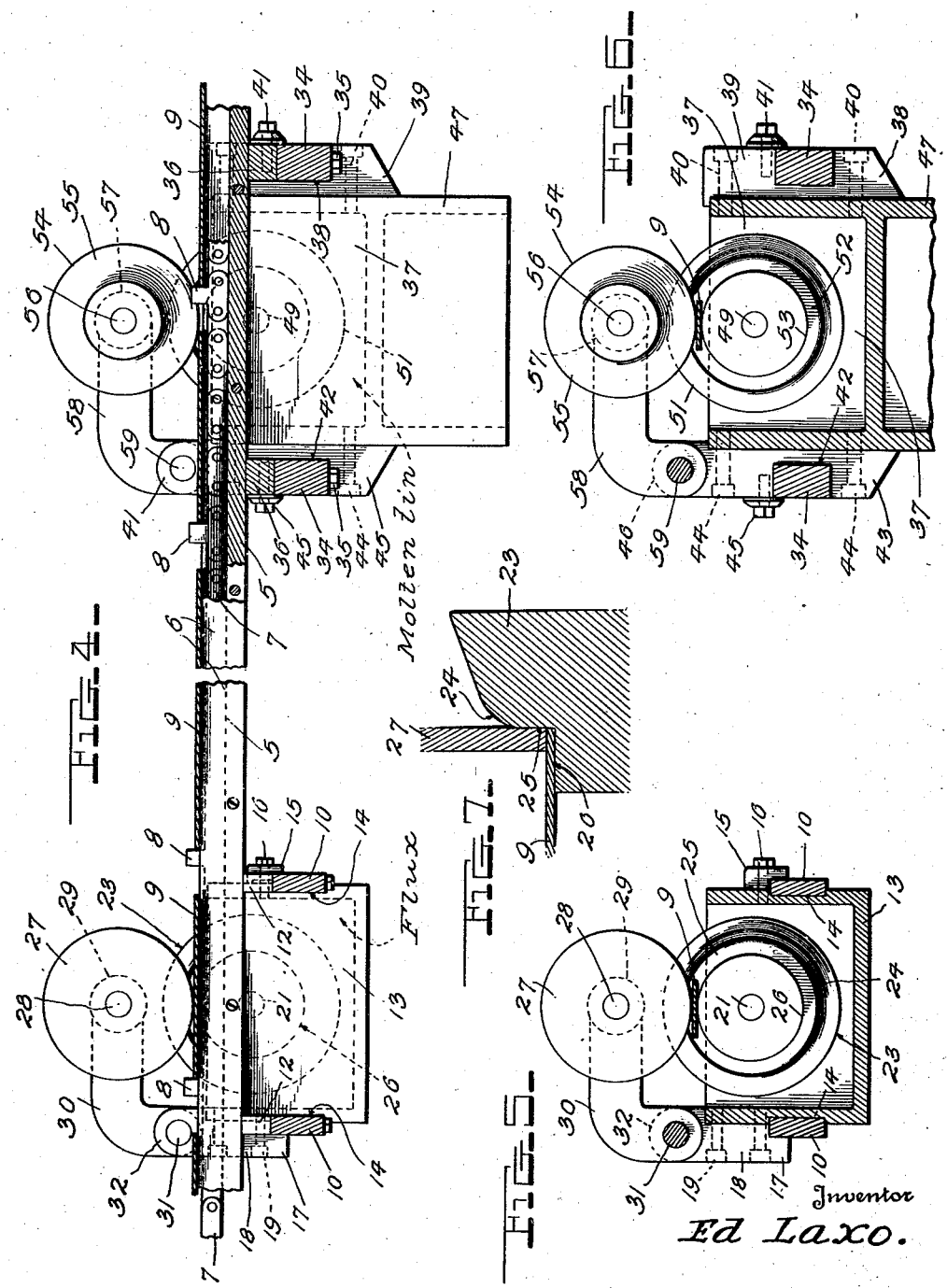

2,382,236

UNITED STATES PATENT OFFICE 2,382,236

APPARATUS FOR TINNING MARGINS OF BLACK IRON CAN BODY BLANKS

Ed Laxo, Riverside, Ill., assignor to Continental Can Company, Inc., New York, N. Y., a corporation of New York Application June 19, 1944, Serial No. 541,086

10 Claims. (Cl. 91—12.2)

The invention relates generally to the art of can making and primarily seeks to provide a novel apparatus for tinning the marginal edge portions of can body blanks subsequently to be brought together in the formation of side seam structures, thereby to facilitate solder bonding of the side seams.

In the manufacture of cans it is essential that the body blanks be tinned at least over the marginal portions which are to be brought together in the formation of side seams in order to assure the efficient solder bonding of the side seams, it being well known that the bonding solder will not efficiently adhere to the black iron bodies without special treatment. It is desirable also to prevent direct contact between foodstuffs and beverages packaged in cans and the black iron in the body structure. This has been accomplished by overall tinning of the body blanks from which the can bodies are formed, but obviously the use of more tin than is absolutely essential is to be avoided during the existing tin shortage. It has been found that satisfactory can bodies can be formed from blanks which are tinned at the marginal edges only, the remaining blank surfaces subsequently to be exposed to foodstuff or beverage contact being given a protective coating of enamel, lacquer or the like. Some materials not subject to contamination by direct contact with the black iron body metal can be packaged in cans made up from blanks that have been tinned only along the marginal edges intended to form the side seams, the remainder of the blanks being devoid of special protective coating. The present invention has to do with novel apparatus for applying tin only to the marginal edge portions of the can body blanks which are to be formed into side seams in the making up of the can bodies. The body blanks may or may not be given a protective coating other than the marginal tinning according to the particular use to which the cans to be made therefrom are to be put.

In its more detailed nature the invention resides in providing a novel can body blank edge tinning apparatus including supporting means over which the can body blanks are conveyed in processional order with their lateral marginal edge portions extended beyond the supporting means, a flux supply disposed at each side of the supporting means, cooperating applicator roll means for distributing flux from the supply to upper and lower lateral marginal edge portions of the travelling blanks, a molten tin supply at each side of the supporting means beyond the flux supply, and cooperating applicator roll means for distributing molten tin from the supply to the previously fluxed upper and lower lateral marginal edge portions of the travelling blanks.

An object of the invention is to provide an apparatus of the character stated in which the lower roll of each cooperating applicator roll set has its lower portion immersed in the flux or molten tin supply, and the upper roll of the set rests by gravity on the lower roll when no can body blank is passing between the rolls and is lifted by each passing blank as it moves in flux or molten tin receiving contact between the cooperating rolls.

Another object of the invention is to provide an apparatus of the character stated in which the upper roll of a set is mounted on a pivotally supported arm so that it can be swung away from the underlying cooperating roll.

Another object of the invention is to provide an apparatus of the character stated in which the rolls of a set are gear coupled to rotate in unison.

Another object of the invention is to provide an apparatus of the character stated in which the lower roll of a set is equipped with a flange which acts as an edge guide for the travelling can body blanks and also as a means for picking up flux or molten tin from the supply and applying it to the upper roll to be in turn applied thereby to the underlying upper marginal edge portions of the travelling blanks.

Another object of the invention is to provide an apparatus of the character stated in which the lower roll of a set is formed so that its guide flange merges through a well rounded shoulder surface into an inwardly tapered extension so as to assure smooth flowing of flux or molten tin picked up by said extension onto the guide flange and applicator surface of the lower roll.

Still another object of the invention is to provide an apparatus of the character stated in which the supporting means includes two longitudinal, parallel spaced support rails, and two transverse sets of parallel spaced support members rigidly attached to said rails, there being a flux reservoir and an applicator roll set at each end between one set of said transverse support members and a molten tin reservoir and an applicator roll set at each end between the other set of said transverse support members.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view illustrating an apparatus embodying the invention.

Figure 2 is a vertical cross section taken on the line 2—2 on Figure 1.

Figure 3 is a vertical cross section taken on the line 3—3 on Figure 1.

Figure 4 is a vertical longitudinal section taken on the line 4—4 on Figure 1.

Figure 5 is a detail vertical longitudinal section taken on the line 5—5 in Figure 1.

Figure 6 is a detail vertical longitudinal section taken on the line 6—6 on Figure 1.

Figure 7 is an enlarged fragmentary sectional view illustrating the cooperative engagement of an upper and lower applicator roll set with a marginal edge portion of a blank being fed therebetween.

In the apparatus herein disclosed as an example of embodiment of the invention, there is included a pair of longitudinal support rails 5 arranged in parallel spaced relation as shown in Figures 1, 2 and 3. Each rail 5 has side pieces 6 secured uprightly to opposite edges thereof, so as to form a guide trough in which to receive a flight of a conveyor chain 7, it being understood that the conveyor chain flights illustrated in the drawings are but portions of endless conveyor chains. The chains 7 are provided with laterally aligned, equidistantly spaced conveyor lugs 8 which serve to convey can body blanks 9 in processional order with lateral marginal edge portions thereof extending beyond the longitudinal supports 6 in the manner clearly illustrated in Figures 1, 2 and 3 of the drawings.

Two cross bars 10 are provided and are disposed in parallel spaced relation transversely of the longitudinal supports 5, 6 in the manner clearly illustrated in Figures 1, 2, 4, and 5, said bars being rigidly secured as at 11, beneath the rails 5 with spacer blocks 12 interposed between the bars and said rails. Between the bars 10 and laterally of the longitudinal supports 5, 6 at each side thereof is mounted a flux reservoir 13. Each reservoir is recessed at its side faces as at 14 to receive the bars 10 and is clamped to one of the bars through the medium of rocker clamps 15 and screws 16 which pass through the rocker clamps 15 into the reservoir body. The reservoir is secured to the other bar by the overhanging lower ends 17 of bracket members 18 which are screw secured as at 19 to the reservoir body at that side. See Figures 2 and 5.

Each flux reservoir 13 is provided with a long bearing 20 in which a shaft 21 is rotatably mounted, said shaft having a spur gear 22 fixed on its outer end, and an inwardly bevelled applicator roll 23 fixed on its inner end. The roll 23 is disposed to rotate within the respective flux reservoir 13 with the lower portion thereof immersed in the flux therein. It will be observed by reference to Figures 1, 2 and 7 of the drawings that the inwardly tapered portion of each lower applicator roll 23 terminates in a well rounded inter-terminus 24 merging into a vertical guide and applicator shoulder 25, the latter forming the outer limit of a cylindriform applicator hub 26. It will be observed by reference to Figure 2 that the cylindriform surfaces of the applicator hubs 26 are disposed at the level of the can body blank supporting surfaces of the longitudinal pieces 6 so that the lateral marginal edge portions of the conveyed blanks will extend over and engage with the hubs and be guided by the vertical flange or shoulder portions 25 in the manner clearly illustrated in Figure 2. Each cylindriform applicator hub 26 is opposed by the cylindriform periphery of an applicator disk 27 secured on an inner end of shaft 28 and rotatably mounted in a bearing 29. Each bearing 29 is carried at the end of arms 30 which are secured to a shaft 31 rockably mounted in bearings 32 at the upper ends of the previously mentioned brackets 18. It will be apparent by reference to Figures 1, 4 and 5 of the drawings that the pivoted arm support for the upper applicator rolls 27 make it possible to swing said upper applicator rolls away from the underlying applicator roll hub portions 26. In order to cause the cooperating upper and lower applicator rolls 27, 26 to rotate in unison, each upper applicator roll shaft 28 is equipped with a spur gear 33 disposed to intermesh with the spur gear 22 fixed on the outer end of the lower rotor shaft 21.

Two cross bars 34 are secured in parallel spaced relation beneath the longitudinal members 56 in the manner clearly illustrated in Figures 1 and 3 of the drawings, the rigid securing of said bars being effected through the medium of screws 35 and spacer blocks 36 as in the case of the previously mentioned bars 10. Between the bars 34 at each side of the longitudinal members 5, 6 there is mounted a molten tin reservoir 37. One of the bars 34 fits into recess 38 formed in mounting brackets 39 which are screw secured as at 40 to one face of the respective reservoir 37 in the manner clearly illustrated in Figures 1 and 6, said bearing being clamped in the bracket recess through the medium of overhanging, screw secured plates 41. The bar 34 in the other side of the reservoir 37 is mounted in recesses 42 formed in brackets 43 which are screw secured as at 44 to the adjacent side face of the reservoir 37, the bar being clamped in said recesses by screw secured overhanging plates 45. The upper ends of the brackets 43 are provided with rocker shaft bearings 46 the purpose of which will presently become apparent.

The reservoirs 37 may be provided with depending skirts 47 into which heat may be directed from any suitable source (not shown) in order to maintain the tin in the reservoir in a molten state. Each reservoir 37 is provided with a long bearing 48. A shaft 49 is rotatably mounted in each bearing 48 and each shaft 49 has a spur gear 50 fixed to its outer end, and an inwardly bevelled applicator roll 51 fixed to its inner end in position for rotating in the housing partially immersed in molten tin therein. It will be observed by reference to Figures 1 and 3 of the drawings that the inwardly tapered portion of each lower applicator roll 51 merges through a well rounded terminus into a vertical guide and applicator flange or shoulder portion 52 which forms the outer limit of a cylindriform applicator hub portion 53 disposed at the same level as the previously mentioned applicator hubs 26 and in position for engaging under the laterally extended edge extremities of the conveyed body blanks 9 in the manner clearly illustrated in Figure 2.

Each lower applicator roll hub portion 53 is opposed by the cylindriform applicator surface of an upper applicator disk 54 having an inwardly disposed bevelled face 55 and secured on the inner end of a shaft 56 which is rotatable in a bearing 57. Each bearing 57 is carried at the free end of arms 58 which are secured to a rocker shaft 59 rockably mounter in the previously mentioned bracket bearings 46. A spur gear is secured on the outer end of each shaft 56 in position for intermeshing with the underlying lower applicator roll gear 50. The pivotal mounting of the arms 58 make it possible to swing the upper applicator rolls 54 away from the underlying applicator hubs 53 whenever desired.

It will be obvious that as can body blanks are conveyed in processional order over the longitudinal support members 6 in the manner clearly illustrated in Figures 1, 2, 3 and 4, the lateral edge extremities of the blanks will first engage between the upper and lower applicator roll sets 26, 27, the lower hubs 26 serving to apply stripes of flux along the undersurface of the blanks at the marginal edges thereof, and the upper applicator rolls 27 serving to similarly apply the flux stripes to the upper surface of said marginal edge portions. By reason of the inward tapering of the applicator rolls 23 and the well rounding of the inner extremities thereof as at 24 the flux picked up by the roll will flow smoothly onto the upright wall 25 of each roll and be applied to the contacting upper applicator roll 27. The flux is directly applied to the cylindriform hub portions 26. The upright roll flanges or guide wall portions 25 of the lower applicator rolls 23 serve as an edge guide for the can body blanks 9 in addition to applying flux to the upper applicator rolls 27 in the manner stated. It will also be obvious that the inward taper of the rolls 23 and the well rounded surface 24 thereof also will serve to engage and properly align any blanks 9 which might be moving along out of proper alignment on the conveyor chains 7, 8.

It will be obvious that the similarly related upper and lower applicator roll sets 54, 51 which cooperate with the molten tin reservoirs 37 will apply the molten tin in the form of marginal stripes to the previously fluxed upper and lower marginal edge surfaces of the cam body blanks moved between them in the same manner described in connection with application of the flux.

As is well known in the art, the marginal edge portions of can body blanks are formed into hooks which are interlocked and bumped in order to form the side seams which subsequently are solder bonded in the completion of the can body formation. Because of the relation of the hooks and the different widths of engaging portions thereof in the finished seam structures, it is desirable that tin stripes of varied widths be applied to the can body blanks so as to assure the desired efficient solder bonding of the side seams in the completion of the can bodies. The reason for this variation in width of the applied tin stripes, and the specific relation of said stripes is disclosed in detail in my copending application for U. S. Letter Patent Serial No. 541,088 filed June 19, 1944, and further detailed description of this arrangement of striping is thought to be unnecessary in this disclosure. It will be apparent, however, by reference to Figures 2 and 3 of the drawings that the upper applicator roll 54 at the right in Figure 3 will apply the narrowest tin stripe, the upper applicator roll 54 at the left in Figure 3 will apply a wider tin stripe, the lower applicator roll hub portion 53 at the left in Figure 3 will apply the next widest tin stripe, and the lower applicator roll hub portion 53 at the right in Figure 3 will apply the widest tin stripe. The flux applicator roll sets bear the same relation, as will be apparent by reference to Figure 2.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, can body blank supporting means, means for conveying blanks over the supporting means in processional order with marginal edge portions thereof extended laterally beyond the supporting means, flux supply means supported adjacent said marginal edge portions, cooperating applicator roll means disposed at each side of said supporting means and effective to distribute flux from the flux supply means to upper and lower surfaces of the laterally extended blank marginal edge portions, molten tin supply means supported adjacent said marginal edge portions, and cooperating applicator roll means disposed at each side of said supporting means and effective to distribute molten tin from the molten tin supply means to the previously fluxed upper and lower surfaces of the laterally extended blank marginal edge portions.

2. In apparatus of the character described, in combination with means for conveying can body blanks in processional order with lateral edge portions of the blanks projecting free of the conveying means, means for applying molten tin to upper and lower surfaces of the blanks at one lateral edge portion thereof comprising, a reservoir adapted to contain a supply of molten tin, an applicator roll rotatable in the reservoir and in position for being partially immersed in molten tin therein, said roll having a cylindriform applicator hub engageable with the under surfaces of conveyed blanks, a second applicator roll having a cylindriform periphery opposed to said hub in position for engaging the upper surfaces of the blanks, and means swingably mounting the second applicator roll for movement away from the first mentioned applicator roll.

3. In apparatus of the character described, in combination with means for conveying can body blanks in processional order with lateral edge portions of the blanks projecting free of the conveying means, means for applying molten tin to upper and lower surfaces of the blanks at one lateral edge portion thereof comprising, a reservoir adapted to contain a supply of molten tin, an applicator roll rotatable in the reservoir and in position for being partially immersed in molten tin therein, said roll having a cylindriform applicator hub engageable with the under surfaces of conveyed blanks, and a second applicator roll having a cylindriform periphery opposed to said hub in position for engaging the upper surfaces of the blanks, said first mentioned roll having an outwardly extending flange disposed for acting as a guide for the lateral blank edge portion being thinner and for engaging and applying molten tin to the second applicator roll.

4. In apparatus of the character described, in combination with means for conveying can body blanks in processional order with lateral edge portions of the blanks projecting free of the conveying means, means for applying molten tin to upper and lower surfaces of the blanks at one lateral edge portion thereof comprising, a reservoir adapted to contain a supply of molten tin, an applicator roll rotatable in the reservoir and in position for being partially immersed in molten tin therein, said roll having a cylindriform applicator hub engageable with the under surfaces of conveyed blanks, and a second applicator roll having a cylindriform periphery opposed to said hub in position for engaging the upper surfaces of the blanks, said first mentioned roll having an outwardly extending flange disposed for acting as a guide for the lateral blank edge portion being tinned and for engaging and applying molten tin to the second applicator roll, said flange merging through a well rounded shoulder surface into an inwardly tapered extension adapted to assure smooth flowing of molten tin picked up from said reservoir by said extension onto said guide and applicator flange.

5. In apparatus of the character described, can body blank supporting means including two longitudinal parallel spaced support rails, means for conveying blanks over said rails in processional order with marginal edge portions thereof extended laterally beyond said rails, two transverse sets of parallel spaced support members rigidly attached to said rails, a reservoir for flux and an applicator roll set at each end between one set of said transverse support members, said roll sets being adapted to distribute flux from said reservoirs to upper and lower surfaces of the laterally extended blank marginal edge portions, and a reservoir for molten tin and an applicator roll set at each end between the other set of said transverse support members, said last mentioned roll sets being adapted to distribute molten tin from said last mentioned reservoirs to the previously fluxed upper and lower surfaces of the laterally extended blank marginal edge portions.

6. In apparatus of the character described, can body blank supporting means including two longitudinal parallel spaced support rails, means for conveying blanks over said rails in processional order with marginal edge portions thereof extended laterally beyond said rails, two transverse sets of parallel spaced support members rigidly attached to said rails, a reservoir for flux and an applicator roll set at each end between one set of said transverse support members, said roll sets being adapted to distribute flux from said reservoirs to upper and lower surfaces of the laterally extended blank marginal edge portions, and a reservoir for molten tin and an applicator roll set at each end between the other set of said transverse support members, said last mentioned roll sets being adapted to distribute molten tin from said last mentioned reservoirs to the previously fluxed upper and lower surfaces of the laterally extended blank marginal edge portions, each said roll set including a lower roll adapted to have its lower portion immersed in flux or molten tin in the respective reservoir and an upper roll disposed to rest by gravity on said lower roll when no can body blank is passing between the rolls of the set and to be lifted by each passing blank as it moves in flux or molten tin receiving contact between the rolls of said set.

7. In apparatus of the character described, can body blank supporting means including two longitudinal parallel spaced support rails, means for conveying blanks over said rails in processional order with marginal edge portions thereof extended laterally beyond said rails, two transverse sets of parallel spaced support members rigidly attached to said rails, a reservoir for flux and an applicator roll set at each end between one set of said transverse support members, said roll sets being adapted to distribute flux from said reservoirs to upper and lower surfaces of the laterally extended blank marginal edge portions, and a reservoir for molten tin and an applicator roll set at each end between the other set of said transverse support members, said last mentioned roll sets being adapted to distribute molten tin from said last mentioned reservoirs to the previously fluxed upper and lower surfaces of the laterally extended blank marginal edge portions, each said roll set including a lower roll adapted to have its lower portion immersed in flux or molten tin in the respective reservoir and an upper roll disposed to rest by gravity on said lower roll when no can body blank is passing between the rolls of the set and to be lifted by each passing blank as it moves in flux or molten tin receiving contact between the rolls of said set, and each said upper roll being mounted on a pivotally supported arm so that it can be swung away from the underlying cooperating roll.

8. In apparatus of the character described, can body blank supporting means including two longitudinal parallel spaced support rails, means for conveying blanks over said rails in processional order with marginal edge portions thereof extended laterally beyond said rails, two transverse sets of parallel spaced support members rigidly attached to said rails, a reservoir for flux and an applicator roll set at each end between one set of said transverse support members, said roll sets being adapted to distribute flux from said reservoirs to upper and lower surfaces of the laterally extended blank marginal edge portions, and a reservoir for molten tin and an applicator roll set at each end between the other set of said transverse support members, said last mentioned roll sets being adapted to distribute molten tin from said last mentioned reservoirs to the previously fluxed upper and lower surfaces of the laterally extended blank marginal edge portions, each said roll set including a lower roll adapted to have its lower portion immersed in flux or molten tin in the respective reservoir and an upper roll disposed to rest by gravity on said lower roll when no can body blank is passing between the rolls of the set and to be lifted by each passing blank as it moves in flux or molten tin receiving contact between the rolls of said set, and the rolls of each said applicator roll set being gear coupled to rotate in unison.

9. In apparatus of the character described, can body blank supporting means including two longitudinal parallel spaced support rails, means for conveying blanks over said rails in processional order with marginal edge portions thereof extended laterally beyond said rails, two transverse sets of parallel spaced support members rigidly attached to said rails, a reservoir for flux and an applicator roll set at each end between one set of said transverse support members, said roll sets being adapted to distribute flux from said reservoirs to upper and lower surfaces of the laterally extended blank marginal edge portions, and a reservoir for molten tin and an applicator roll set at each end between the other set of said transverse support members, said last mentioned roll sets being adapted to distribute molten tin from said last mentioned reservoirs to the previously fluxed upper and lower surfaces of the laterally extended blank marginal edge portions, each said roll set including a lower roll adapted to have its lower portion immersed in flux or molten tin in the respective reservoir and an upper roll disposed to rest by gravity on said lower roll when no can body blank is passing between the rolls of the set and to be lifted by each passing blank as it moves in flux or molten tin receiving contact between the rolls of said set, and the lower roll of each said applicator roll set having a flange thereon which acts as an edge guide for the travelling can body blanks and also as a means adapted for picking up flux or molten tin from the respective reservoir and applying it to the cooperating upper roll to be in turn applied thereby to the underlying upper marginal edge portions of the travelling blanks.

10. In apparatus of the character described, can body blank supporting means including two longitudinal parallel spaced support rails, means for conveying blanks over said rails in processional order with marginal edge portions thereof extended laterally beyond said rails, two transverse sets of parallel spaced support members rigidly attached to said rails, a reservoir for flux and an applicator roll set at each end between one set of said transverse support members, said roll sets being adapted to distribute flux from said reservoirs to upper and lower surfaces of the laterally extended blank marginal edge portions, and a reservoir for molten tin and an applicator roll set at each end between the other set of said transverse support members, said last mentioned roll sets being adapted to distribute molten tin from said last mentioned reservoirs to the previously fluxed upper and lower surfaces of the laterally extended blank marginal edge portions, each said roll set including a lower roll adapted to have its lower portion immersed in flux or molten tin in the respective reservoir and an upper roll disposed to rest by gravity on said lower roll when no can body blank is passing between the rolls of the set and to be lifted by each passing blank as it moves in flux or molten tin receiving contact between the rolls of said set, and the lower roll of each said applicator roll set having a flange thereon which acts as an edge guide for the travelling can body blanks and also as a means adapted for picking up flux or molten tin from the respective reservoir and applying it to the cooperating upper roll to be in turn applied thereby to the underlying upper marginal edge portions of the travelling blanks, and each said flange merging through a well rounded shoulder surface into an inwardly tapered extension adapted to assure smooth flowing of flux or molten tin picked up from the respective reservoir by said extension onto said guide and applicator flange.

ED LAXO.